(12) United States Patent
Shimai et al.

(10) Patent No.: US 9,424,040 B2
(45) Date of Patent: Aug. 23, 2016

(54) LSI AND LSI MANUFACTURING METHOD

(71) Applicant: Mitsubishi Electric Corporation, Chiyoda-ku (JP)

(72) Inventors: Yusuke Shimai, Chiyoda-ku (JP); Osamu Toyama, Chiyoda-ku (JP); Yoshihiro Ogawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/429,157

(22) PCT Filed: Jul. 4, 2013

(86) PCT No.: PCT/JP2013/004155
§ 371 (c)(1),
(2) Date: Mar. 18, 2015

(87) PCT Pub. No.: WO2014/045500
PCT Pub. Date: Mar. 27, 2014

(65) Prior Publication Data
US 2015/0234658 A1 Aug. 20, 2015

(30) Foreign Application Priority Data

Sep. 21, 2012 (JP) ................................ 2012-207726

(51) Int. Cl.
*G06F 9/02* (2006.01)
*G06F 9/30* (2006.01)

(52) U.S. Cl.
CPC ........ *G06F 9/30145* (2013.01); *G06F 9/30098* (2013.01)

(58) Field of Classification Search
CPC ........................................................ G06F 9/02
See application file for complete search history.

(56) References Cited

U.S. PATENT DOCUMENTS

| 5,535,379 | A | 7/1996 | Koura |
| 2008/0091865 | A1 | 4/2008 | Maeda |
| 2009/0031113 | A1* | 1/2009 | Nakaya ................. G06F 9/3853 712/208 |

FOREIGN PATENT DOCUMENTS

| JP | 07-064957 A | 3/1995 |
| JP | 2004-362157 A | 12/2004 |
| JP | 2007-272688 A | 10/2007 |
| JP | 2008-097372 A | 4/2008 |
| JP | 2010-277436 A | 12/2010 |

OTHER PUBLICATIONS

International Search Report issued Sep. 24, 2013 in PCT/JP2013/004155 Filed Jul. 4, 2013.

\* cited by examiner

*Primary Examiner* — Cheng-Yuan Tseng
(74) *Attorney, Agent, or Firm* — Oblon, McClelland, Maier & Neustadt, L.L.P.

(57) ABSTRACT

An LSI includes an address decoder in which combinations of IP cores and control registers simultaneously accessed according to an operation mode signal are set in advance, so that the plurality of control registers can be accessed with a single system address signal. Therefore, it is unnecessary that the CPU is provided with selection signals whose number is equal to that of the combinations of the control registers. This reduces coding work for operating CPU, reducing work in developing a program of the CPU.

3 Claims, 13 Drawing Sheets

Fig. 3

| System address | Instance name | Control register name | In-IP address |
|---|---|---|---|
| 0 | ipa1 | format | 0 |
| 1 | ipa1 | resolution | 1 |
| 2 | ipa1 | framerate | 2 |
| 3 | ipa2 | format | 0 |
| 4 | ipa2 | resolution | 1 |
| 5 | ipa2 | framerate | 2 |
| 6 | ipb | format | 0 |
| 7 | ipb | framerate | 1 |
| 8 | ipc | format | 0 |
| 9 | ipc | resolution | 1 |

4ipa1

| In-IP address | System address | | |
|---|---|---|---|
| | When reading | When writing | |
| | | Operation mode == Path 1 | Operation mode == Path 2 |
| 0 | 0 | 0, 6 | 0, 8 |
| 1 | 1 | 1 | 1, 9 |
| 2 | 2 | 2, 7 | 2 |
| 3 | | | |

4ipa2

| In-IP address | System address | | |
|---|---|---|---|
| | When reading | When writing | |
| | | Operation mode == Path 1 | Operation mode == Path 2 |
| 0 | 3 | 3, 8 | 3, 6 |
| 1 | 4 | 4, 9 | 4 |
| 2 | 5 | 5 | 5, 7 |
| 3 | | | |

4ipb

| In-IP address | System address | | |
|---|---|---|---|
| | When reading | When writing | |
| | | Operation mode == Path 1 | Operation mode == Path 2 |
| 0 | 6 | 0, 6 | 3, 6 |
| 1 | 7 | 2, 7 | 5, 7 |

4ipc

| In-IP address | System address | | |
|---|---|---|---|
| | When reading | When writing | |
| | | Operation mode == Path 1 | Operation mode == Path 2 |
| 0 | 8 | 3, 8 | 0, 8 |
| 1 | 9 | 4, 9 | 1, 9 |

| IP name | Instance name |
|---------|---------------|
| IPA | ipa1 |
| IPA | ipa2 |
| IPB | ipb |
| IPC | ipc |

IPA

| In-IP address | Control register name |
|---|---|
| 0 | format |
| 1 | resolution |
| 2 | framerate |
| 3 | - |

IPB

| In-IP address | Control register name |
|---|---|
| 0 | format |
| 1 | framerate |

IPC

| In-IP address | Control register name |
|---|---|
| 0 | format |
| 1 | resolution |

Operation mode = Path 1

| group1 | group2 | group3 | group4 |
|---|---|---|---|
| ipa1.format | ipa1.framerate | ipa2.format | ipa2.resolution |
| ipb.format | ipb.framerate | ipc.format | ipc.resolution |

Operation mode = Path 2

| group1 | group2 | group3 | group4 |
|---|---|---|---|
| ipa1.format | ipa2.format | ipa2.framerate | ipa1.resolution |
| ipc.format | ipb.format | ipb.framerate | ipc.resolution |

LSI AND LSI MANUFACTURING METHOD

TECHNICAL FIELD

The present invention relates to an LSI including a plurality of IP cores and a method of manufacturing the LSI.

BACKGROUND ART

Recently, a method has been used in which an LSI is designed by connecting circuit blocks called as IP cores (Intellectual Property Cores). In order to control each IP core, an IP core control register placed in the each IP core is accessed by a CPU. At this moment, in a case where a plurality of IP cores performing similar processing is used, it is usual that a same value is written to each of the control registers controlling the respective IP cores. However, the CPU must access every control register one by one to write the same value, resulting in a problem the CPU's load increases. In order to solve the problem described above, an LSI is proposed (for example, in Patent Document 1) in which two IP cores are parallelly operated by accessing a common address corresponding to the two IP cores, reducing the CPU's load.

PRIOR ART DOCUMENT

Patent Document

Patent Document 1: Japanese Patent Laid-Open Publication No. 2004-362157

SUMMARY OF THE INVENTION

Problem to be Solved by the Invention

An LSI disclosed in Patent Document 1 is provided with two IP cores and one address decoder. Each of the IP cores includes, thereinside, a plurality of control registers. For control registers to which the same value is written across the IP cores, same common addresses are assigned as addresses specifying the control registers. In order to access registers, the CPU outputs an upper address (a selection signal) and a lower address (a common address). The upper addresses can specify a plurality of IP cores, and the lower addresses can specify a plurality of control registers to which a same value is written. However, in a case where the number of IP cores to be used increases and it is desired to change combinations of IP cores to be simultaneously accessed, it is necessary to prepare common addresses whose number is equal to that of the IP core combinations, which thereby increases complexity in a program to be executed on the CPU. This brings much work to code the CPU operation, resulting in a problem that the load of developing the program increases.

The present invention is made to solve the problems described above and aims to reduce the load of developing the CPU program and make a plurality of IP cores be simultaneously accessible.

Means for Solving Problem

An LSI according to the present invention includes: a plurality of IP cores each of which has a plurality of registers and processes input data; an address decoder that selects a register among the plurality of registers and activates it; a CPU that outputs to the address decoder, a system address signal designating a register of an IP core used for processing the input data, and writes information of the input data to a register activated by the address decoder; and an operation mode control circuit which outputs to the address decoder, an operation mode signal specifying a combination of the IP cores used for processing the input data, wherein the address decoder determines, according to the operation mode signal, a combination of the IP cores used for processing the input data, and wherein among registers of the IP cores determined to be used, the address decoder selects and activates the register designated by the system address signal and another register into which to write the same information as that in the designated register.

A method, according to the present invention, of manufacturing an LSI including a plurality of IP cores each of which has a plurality of registers and processes input data, an address decoder that selects a register among the plurality of registers and activates it, and a CPU that outputs to the address decoder, a system address signal designating a register of an IP core used for processing the input data, and writes information of the input data to a register activated by the address decoder, comprises: a step of producing a system address map in which system addresses for the CPU to identify the plurality of registers and in-IP addresses for the address decoder to identify the plurality of registers are assigned to the individual registers; a step of producing register grouping information which configures a group including a plurality of registers activated by a single system address signal; a step of producing, using the system address map and the register grouping information, address-decoding information which relates a plurality of system addresses included in a same group to the in-IP addresses; and a step of producing the address decoder on the basis of the address-decoding information.

Effect of the Invention

An LSI according to the present invention is provided with an address decoder which selects a control register specified from a single system address signal and selects another register to which to write the same information as the specified control register; therefore, even in a case where the number of IP cores to be used increases, a plurality of control registers can be accessed with the single address signal without increasing the load of developing the CPU program.

BRIEF DESCRIPTION OF THE DRAWINGS

FIG. 3 is a diagram showing a system address map according to Embodiment 1;

FIG. 4 is a diagram showing address-decoding information of individual IP cores according to Embodiment 1;

FIG. 12 is a diagram showing address maps of individual IP cores according to Embodiment 5;

FIG. 13 is a diagram showing control register grouping information according to Embodiment 5.

MODES FOR CARRYING OUT THE INVENTION

Embodiment 1

Figure 1:
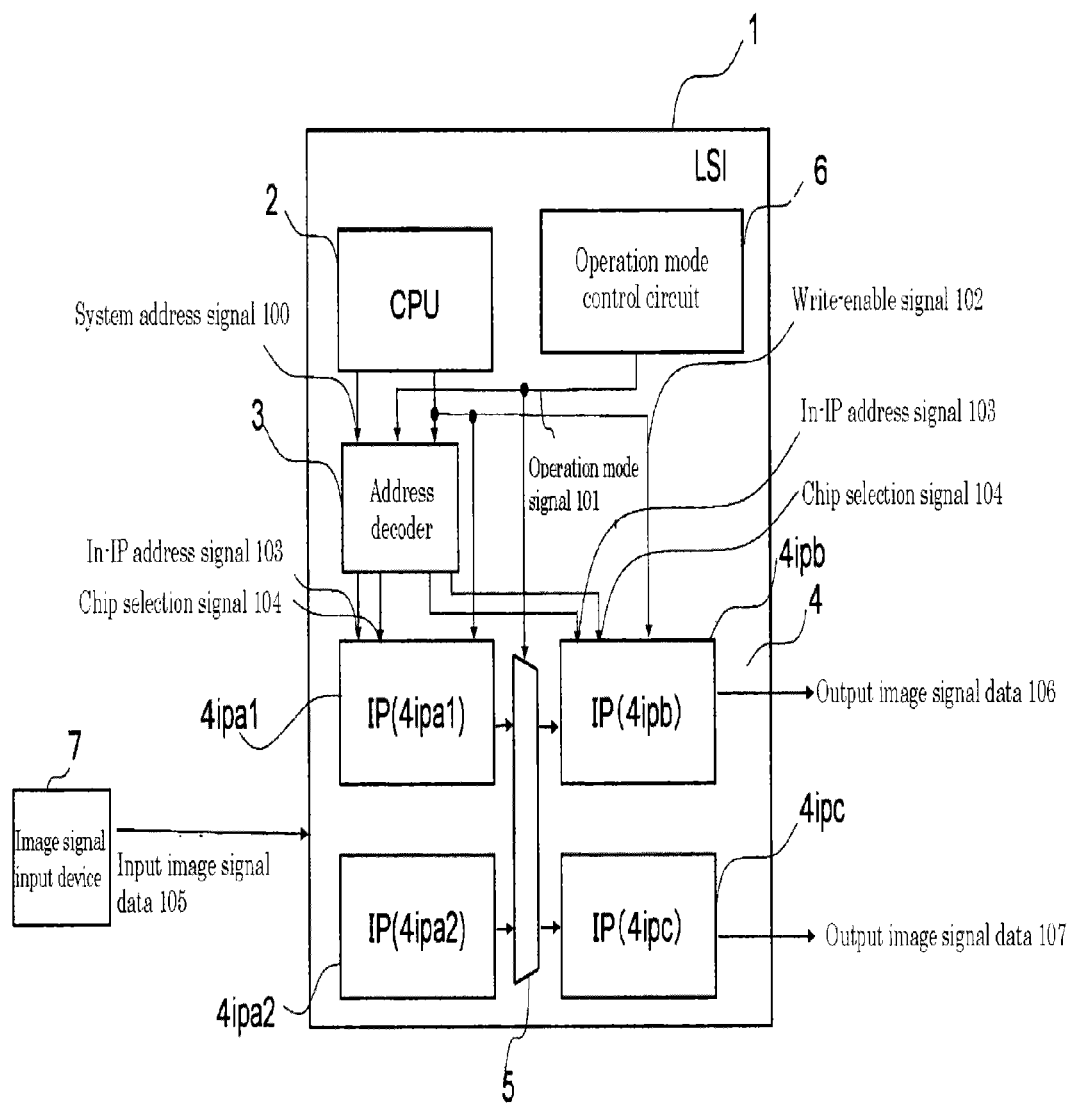
FIG. 1 is a configuration diagram of an LSI according to Embodiment 1.
Figure 2:
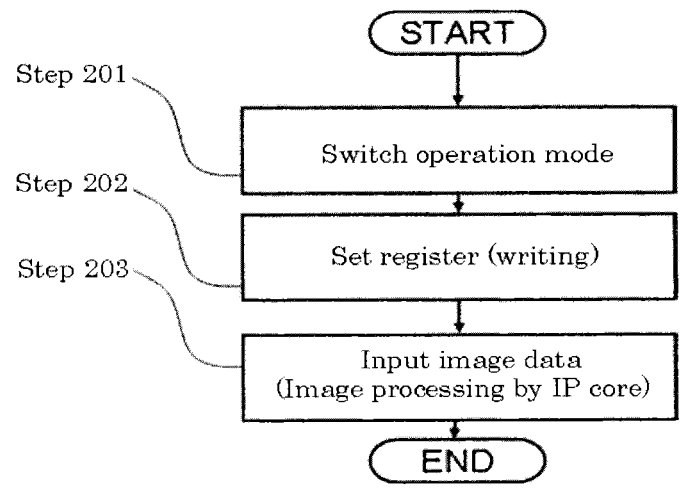
FIG. 2 is a diagram showing an operation flow chart of the LSI according to Embodiment 1.
Figure 5:
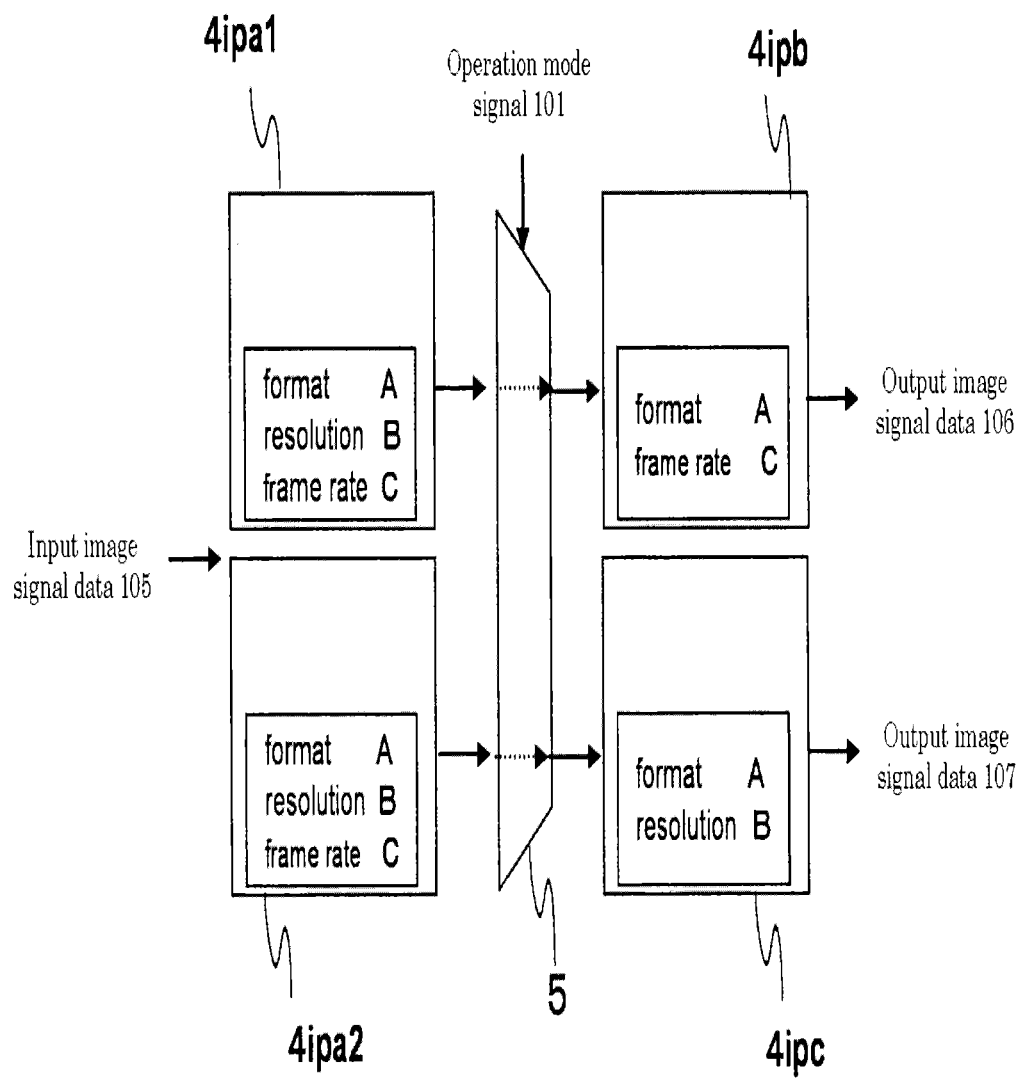
FIG. 5 is a diagram showing an example in which input image signal data is processed by the mutually connected IP cores according to Embodiment 1 (when selecting a path 1)

Hereinafter, an LSI according to Embodiment 1 of the present invention will be explained using FIGS. 1 to 5, in which an LSI for processing image signal data is taken as an example. FIG. 1 is a configuration diagram of the LSI according to Embodiment 1. FIG. 2 is a diagram showing an operation flow chart of the LSI according to Embodiment 1. FIG. 3 is a diagram showing a system address map according to Embodiment 1. FIG. 4 is a diagram showing address-decoding information of individual IP cores according to Embodiment 1. FIG. 5 is a diagram showing an example in which input image signal data is processed by the mutually connected IP cores according to Embodiment 1 (when selecting a path 1).

As shown in FIG. 1, the LSI 1 according to Embodiment 1 includes a CPU 2, an operation mode control circuit 6, an address decoder 3, IP cores (4*ipa*1, 4*ipa*2, 4*ipb*, 4*ipc*) (hereinafter, the respective IP cores are collectively called as "IP core 4"), and a selector 5. On the basis of various kinds of information such as a format and a resolution inputted through a user interface or the like (not shown in the figure), the LSI 1 performs a picture quality adjustment process or the like for input image signal data 105 (input data) outputted from an image signal input device 7, and then outputs output image signal data 106 or 107.

The CPU 2 accesses a later described IP core 4 so as to make the IP core 4 process the input image signal data 105. When accessing, the CPU 2 also outputs a system address signal 100 and a write-enable signal 102. Here, the system address signal 100 is a signal which indicates a system address. The system address is a value by which the CPU 2 locates any element (including a memory or the like not shown in the figure). The write-enable signal 102 is a signal which indicates whether an access to a control register by the later described address decoder 3 is a reading-out operation or a writing operation. When a control register is accessed to be read out, the write-enable signal becomes "Read"; and when to be written, "Write." When a control register is accessed by the address decoder 3, the control register turns into a readable state or a writable state. These states are referred to as "active."

The operation mode control circuit 6 outputs an operation mode signal 101. Here, the operation mode signal 101 is a signal that determines a combination of the IP cores 4 to be used when the LSI 1 processes the input image signal data 105.

The address decoder 3 receives the system address signal 100, the operation mode signal 101, and the write-enable signal 102, to output an in-IP address signal 103 and a chip selection signal 104. In addition, the in-IP address signal 103 is a signal which indicates an in-IP address. The in-IP address is an address by which the address decoder 3 locates a control register of the later described IP core 4. By the address decoder 3, the CPU 2 can access a desired IP core 4.

The IP core 4 is a function block which performs a specific process, for example an image processing circuit or an audio processing circuit. The IP core 4 includes, thereinside, a control register, into which the CPU 2 writes information such as a format and the like of the input image signal data 105 to process the input image signal data 105. The IP core 4 receives the in-IP address signal 103, the chip selection signal 104, and the write-enable signal 102 to activate a control register. For the activated control register, the CPU 2 performs a writing process. For example, in a case where the input image signal data 105 is to be converted to that in a desired format, the CPU 2 writes the desired format into the activated control register.

The selector 5 changes the connection relation between the plurality of IP cores 4. The selector 5 receives the operation mode signal 101 to switch paths for processing the input image signal data 105.

Next, operations of the LSI 1 will be explained using FIG. 2.

Step 201 is a step of switching operation modes. The step of switching operation modes is a step in which the selector 5 switches combinations of the IP cores 4 for processing the input image signal data 105.

In Step 201, the operation mode control circuit 6 outputs an operation mode signal 101 to the selector 5 and the address decoder 3.

According to the operation mode signal 101, the selector 5 selects specified IP cores 4 among the plurality of IP cores 4 to be used. For example, in a case where the operation mode of the operation mode signal 101 is for the path 1, the selector 5 connects the IP core 4*ipa*1 and the IP core 4*ipb*, and further connects the IP core 4*ipa*2 and the IP core 4*ipc*. Alternatively, in a case where the operation mode is for the path 2, the selector 5 connects the IP core 4*ipa*1 and the IP core 4*ipc*, and connects the IP core 4*ipa*2 and the IP core 4*ipb*. Here, the combination of IP cores 4 to be connected corresponds to a combination of IP cores 4 which include the control registers activated by a single system address signal described later in Step 202. For example, in a case where the control registers in the IP core 4*ipa*1 and the IP core 4*ipb* are activated by a single system address signal, the selector 5 connects the IP core 4*ipa*1 and the IP core 4*ipb*. When completing switching the connections of the IP cores 4, the process transitions to Step 202.

Step 202 is a step in which register setting is performed. The register setting is an operation to write information about the input image signal data 105 into the control register activated by the CPU 2.

In Step 202, the CPU 2 outputs the system address signal 100 and a write-enable signal 102 to the address decoder 3. The CPU 2 further outputs the write-enable signal 102 to the IP cores 4.

Next, the address decoder 3 receives the system address signal 100 and the write-enable signal 102 from the CPU 2 and receives the operation mode signal 101 from the operation mode control circuit 6, to output an in-IP address signal 103 and a chip selection signal 104 to the IP cores 4.

Here, using FIG. 3 and FIG. 4, detailed explanation will be made about how the address decoder 3 outputs the in-IP address signal 103 and the chip selection signal 104 after receiving the system address signal 100, the write-enable signal 102, and the operation mode signal 101.

FIG. 3 is a diagram showing a system address map according to Embodiment 1. The address decoder 3 utilizes this system address map 301 to determine an in-IP address signal 103 and a chip selection signal 104.

In the system address map 301, a system address of each control register is related to an instance name of an IP core 4 to be used, a control register name, and an in-IP address. The instance name is a name assigned to identify each IP core 4. Here, the instance names of the IP cores 4ipa1, 4ipa2, 4ipb, and 4ipc correspond to ipa1, ipa2, ipb, and ipc, respectively. Each control register name represents a name of a control register in an IP core 4, and is named after a value to be written. For example, for a control register into which to write a format of the input image signal data 105, a control register name of "format" is assigned. Similarly, for a control register into which to write a resolution, "resolution" is assigned; for a control register into which to write a frame rate, "framerate" is assigned. An in-IP address is a value, by which the address decoder 3 locates a control register, and is assigned to each control register in each IP core 4. Unlike a system address, it is sufficient that with an in-IP address, a control register can be located within an IP core; therefore, a same value may be assigned to control registers in different IP cores. For example, in FIG. 3, in-IP addresses of 0 to 2 are assigned to the control registers in each IP core 4. According to this system address map 301, address-decoding information 302 shown in FIG. 4 is produced.

FIG. 4 is a diagram showing address-decoding information 302. In the address-decoding information 302, each in-IP address in each IP core 4 is related to a plurality of system addresses. A combination (group) of a plurality of system addresses corresponding to one in-IP address is a combination of control registers which can be accessed with one system address signal and to which a same value is written. For example, in the table for the IP core 4ipa1, system addresses of "0, 6", "1", and "2, 7" are assigned to "operation mode signal=path 1". Referring to the system address map 301 in FIG. 3, for example, the system addresses of "2, 7" correspond to a control register framerate in the IP core 4ipa1 (instance name:ipa1) and a control register framerate in the IP core 4ipb (instance name: ipb). This means that a same value is written into these control registers by the CPU 2. Similarly, other system addresses of "0, 6" and "1" are combinations of registers into which a same value is written.

The address-decoding information 302 includes, as described above, a plurality of combinations of system addresses according to operation modes; therefore, even in a case where the IP cores to be used are switched, the combination of the control registers to be accessed can be changed, without rewriting the program of the CPU 2, only by changing the value of the operation mode signal 101 of the operation mode control circuit 6.

The combination of the system address and the in-IP address in the address-decoding information 302 is also changed by the types of the operation mode signal 101 and the write-enable signal 102. When the write-enable signal 102 inputted to the address decoder 3 indicates "Write", the address decoder refers to a column of "When Writing" in the address-decoding information 302; when the inputted write-enable signal 102 indicates "Read", the address decoder refers to a column of "When Reading." Furthermore, according to the kind of the inputted operation mode signal 101, the address decoder 3 refers to a column of "operation mode=path 1" or "operation mode=path 2" in the address-decoding information 302.

Next, using an example in which the write-enable signal 102 indicates "Write" and the operation mode signal 101 indicates the path 1, explanation will be made about an operation by which the address decoder 3 converts the system address signal 102 to the in-IP address signal 103.

In response to receiving the system address signal 100, the address decoder 3 searches for a corresponding system address in a column of "operation mode=path 1" in the address-decoding information 302 and converts an in-IP address described in a row hit by the search into an in-IP address signal 103 to be outputted. For example, in a case where "2" is inputted as the system address signal 100, the address decoder 3 refers to a system address of "2" in the column of "operation mode=path 1." In the column of "operation mode=path 1", rows including the system address of "2" are a row including an in-IP address of "2" in the table for the IP core 4ipa1 and a row including an in-IP address of "1" in the table for the IP core 4ipb. Therefore, the address decoder 3 outputs "2" as the corresponding in-IP address signal 103 to the IP core 4ipa1, and outputs "1" as the in-IP address signal 103 to the IP core 4ipb. Furthermore, in a case where the operation mode is the path 1, the system addresses of "2, 7" are in a same group; therefore, even in a case where the system address signal 102 is "7", the same in-IP addresses are outputted to the same IP cores (4ipa1, 4ipb).

As described above, system addresses are set as groups in the address-decoding information 302, so that the address decoder 3 can convert the system address signal 100 indicating one system address to the in-IP address signal 103 indicating a plurality of control registers.

The above explanation has been made, under an assumption that software is utilized, about a method which converts the system address signal 100, the operation mode signal 101, and the write-enable signal 102 to the in-IP address signal 103 and the chip selection signal 104; however, the address decoder 3 can also be realized using hardware such as electronic circuits on the basis of relations in the address-decoding information 302.

As described above, the address decoder 3 converts the system address signal 100, the write-enable signal 102, and the operation mode signal 101 into the in-IP address signal 103, which is outputted to the corresponding IP core 4. Furthermore, the address decoder 3 outputs an enabling signal as the chip selection signal 104 to activate the IP core 4 including the control register designated by the in-IP address signal 103.

Next, explanation will be made about a process in which the IP core 4 receives the in-IP address signal 103 and the chip selection signal 104 to activate the control register. In response to receiving the in-IP address signal 103 and the chip selection signal 104 outputted from the address decoder 3, an IP core 4 activates a control register designated by the in-IP address signal 103.

In a case where the write-enable signal 102 indicates "Write", the IP core 4 writes, through a signal line (not shown in the figures) directly connected from the CPU 2, a value of a format or the like into the activated control register. When values are written into all of the control registers, Step 202 of writing and setting into the control registers is completed, so that the process transitions to Step 203.

Step 203 is a step in which the IP core 4 processes the input image signal data 105. In Step 203, the input image signal data 105 is inputted to an IP core 4 from the image signal input device 7 outside the LSI 1. After the input image signal data 105 is processed in the IP core 4, the input image signal data is successively processed by one or more IP cores 4 connected at Step 201 and finally outputted as the output image signal data 106 or 107. For example, in a case where the IP core 4ipa1 and the IP core 4ipb are connected by the selector 5, the input image signal data 105 passes successively through the IP cores 4*ipa*1 and 4*ipb*, to be outputted as the output image signal data 106. On the other hand, in a case where the IP core 4*ipa*2 and the IP core 4*ipc* are connected, the input image signal data passes successively through the IP core 4*ipa*2 and 4*ipc* to be outputted as the output image signal data 107. At this point, a series of operations of the LSI 1 is completed.

So far, the operations of the LSI 1 according to Embodiment 1 have been explained. Next, explanation will be made about a series of operations in which the IP cores 4 connected to each other perform to the input image signal data 105, taking image signal data processing as an example and using FIG. 5. In this example, explanation will be made taking as an example a case where the system address signal is "0", the write-enable signal 102 is "Write", and the operation mode signal 101 indicates the path 1.

Firstly, as has been explained in Step 201, the operation mode control circuit 6 outputs the operation mode signal 101 indicating the path 1 to the selector 5 and the address decoder 3. On the basis of a value of the operation mode signal 101, the selector 5 selects a previously determined combination of the IP cores 4, to connect therebetween. In this example, the selector 5 connects the IP core 4*ipa*1 and the IP core 4*ipb*, and connects the IP core 4*ipa*2 and the IP core 4*ipc*. The operation mode control circuit 6 outputs, also to the address decoder 3, the operation mode signal 101 indicating the path 1.

Next, as has been explained in Step 202, the CPU 2 having received a register-writing instruction for processing the input image signal data 105 outputs, to the address decoder 3, the system address signal 100 indicating "0" and the write-enable signal 102 indicating "Write." In an "operation mode=path 1" column in the address-decoding information 302, the address decoder 3 having received these signals refers to rows including a system address of "0." At this moment, in-IP addresses in rows with the system address of "0" are an in-IP address of "0" in a table for 4*ipa*1 and an in-IP address of "0" in a table for 4*ipb*. In the system address map 301, an in-IP address of "0" in the IP core 4*ipa*1 corresponds to a control register format, and an in-IP address of "0" in the IP core 4*ipb* corresponds to a control register format. Therefore, the address decoder 3 converts the system address signal 100 indicating "0" to the in-IP address signal 103 indicating "0" to output to the IP core 4*ipa*1 and the IP core 4*ipb* and indicate the control registers format to be activated. The address decoder 3 outputs enabling signals as the chip selection signal 104 to the control registers format in the indicated IP core 4*ipa*1 and IP core 4*ipb* to activate the control registers format.

When receiving the write-enable signal 102 indicating "Write", the IP core 4*ipa*1 and the IP core 4*ipb* which include the activated control registers format determine "writing". As shown in FIG. 5, the CPU 2 writes information about the input image signal data 105 (here, the information about the input image signal data 105 is assumed to be "A" which represents a format of the input image signal data 105 such as MPEG) into the control registers format of the IP core 4*ipa*1 and the IP core 4*ipb*, through signal lines (not shown in the figure) directly connected from the CPU 2.

Similarly, the CPU 2 outputs the system address signal 100 indicating "1" and "2", to write values of "B" and "C" representing information of the input image signal data 105 into the remaining control registers resolution and control registers framerate, respectively.

When the system address signal 100 indicating "1" is inputted to the address decoder 3, the in-IP address signal 103 is outputted as "1" to the IP core 4*ipa*1, to specify a control register resolution.

The address decoder 3 outputs a chip selection signal 104 to a control register resolution of the specified IP core 4*ipa*1 to be activated. Next, the value "B" is written by the CPU 2 into the activated control register resolution of the IP core 4*ipa*1. Furthermore, when the system address signal 100 indicating "2" is inputted to the address decoder 3, "2" is outputted as an in-IP address signal 103 to the IP core 4*ipa*1, and "1" is outputted as an in-IP address signal 103 to the IP core 4*ipb*, respectively, to specify control registers framerate. The address decoder 3 outputs "enable" as chip selection signals 104 to the specified control registers framerate of the IP core 4*ipa*1 and the IP core 4*ipb* to be activated. A value of "C" is written into the activated control registers framerate by the CPU 2 (Here, "B" is assumed to be a value expressing a resolution, and "C", a value expressing a frame rate). In addition, values written to the control registers, that is, a value "A" representing a format, a value "B" representing a resolution and a value "C" representing a frame rate are varied according to the kind of the input image signal data 105.

After completing the writing operations, as has been explained in Step 203, the input image signal data 105 passes successively through the IP core 4*ipa*1 and the IP core 4*ipb* which include control registers with the same value written therein, to be outputted as output image signal data 106 on which data processing such as picture quality adjustment has been performed. For example, in a case where the IP core 4*ipa*1 is an IP core 4 functioning to reduce noise, and the IP core 4*ipb* is an IP core 4 converting color tones, the input image signal data 105 is outputted as output image signal data 106 in which noise has been reduced and color tones are converted.

In the explanation above, the LSI 1 uses the IP core 4*ipa*1 and the IP core 4*ipb* to process the input image signal data 105; however, it is possible for the LSI 1 to use the IP core 4*ipa*2 and the IP core 4*ipc* to process the input signal data 105. At this moment, similarly to the example of writing into the IP core 4*ipa*1 and the IP core 4*ipb*, the CPU 2 outputs the system address signal 100 indicating "3", "4", and "5" to the address decoder 3. Then, in response to receiving the system address signal 100, the address decoder 3 refers to tables for 4*ipa*2 and 4*ipc* in the address-decoding information 302, to activate control registers format, resolution, and framerate in the IP core 4*ipa*2 and the IP core 4*ipc*. The CPU 2 performs writing on the activated control registers. After completing the register setting described above, the input image signal data 105 passes successively through the IP core 4*ipa*2 and the IP core 4*ipc* to be outputted as output signal data 107.

Furthermore, the LSI 1 can process the input signal data 105, using the IP core 4*ipa*1 and the IP core 4*ipc*, and the IP core 4*ipa*2 and the IP core 4*ipb* (not shown in the figure). On that occasion, the operation mode control circuit 6 outputs an operation mode signal indicating the path 2 to the selector 5. Furthermore, the selector 5 connects the IP core 4*ipa*1 and the IP core 4*ipc*, and connects the IP core 4*ipa*2 and the IP core 4*ipb*. Moreover, the address decoder 3 refers to a column of the path 2 in the address-decoding information 302.

In addition, in the LSI 1 according to Embodiment 1, explanation has been made under an assumption that the IP cores 4 process image signal data; however, data to be processed is not limited thereto, and any kind of data may be processed. For example, the IP cores 4 may process an audio signal. On that occasion, the LSI 1 does not process the input image signal data 105, but processes audio signal data.

Furthermore, although in the LSI 1 according to Embodiment 1, four IP cores 4 are used, the present invention is not limited to that configuration; that is, the present invention can be applied to an LSI in which a plurality of control registers is selected by a single system address signal and which has two or more IP cores. In addition, in a case where the LSI 1 according to Embodiment 1 receives an operation mode signal to switch the IP cores 4 to be used, at least three IP cores 4 are necessary.

Furthermore, in the LSI 1 according to Embodiment 1, explanation has been made about a case where the address decoder 3 receives a single system address signal to write a same value into one control register or two control registers; however, the configuration is not limited thereto, and the LSI may be configured so that three or more control registers are to be written. In this case, three or more system addresses are related to a row for a single in-IP address in the address-decoding information 302.

As described above, in the LSI 1 according to Embodiment 1, the combinations of the IP cores 4 and control registers, which are to be accessed with the operation mode signal 101 and the single system address signal, are set in advance; therefore, it is unnecessary to prepare selection signals for the CPU 2, whose number is the number of combinations of the control registers, causing a reduction in developing a program for the CPU 2.

Furthermore, in the LSI 1 according to Embodiment 1, the address decoder 3 operates in accordance with the address-decoding information in which each in-IP address is related to a plurality of system addresses; therefore, the address decoder can access a plurality of control registers by receiving a single system address signal.

Embodiment 2

Using FIG. 6 and FIG. 7, an LSI 1 according to Embodiment 2 will be explained.

Figure 6:
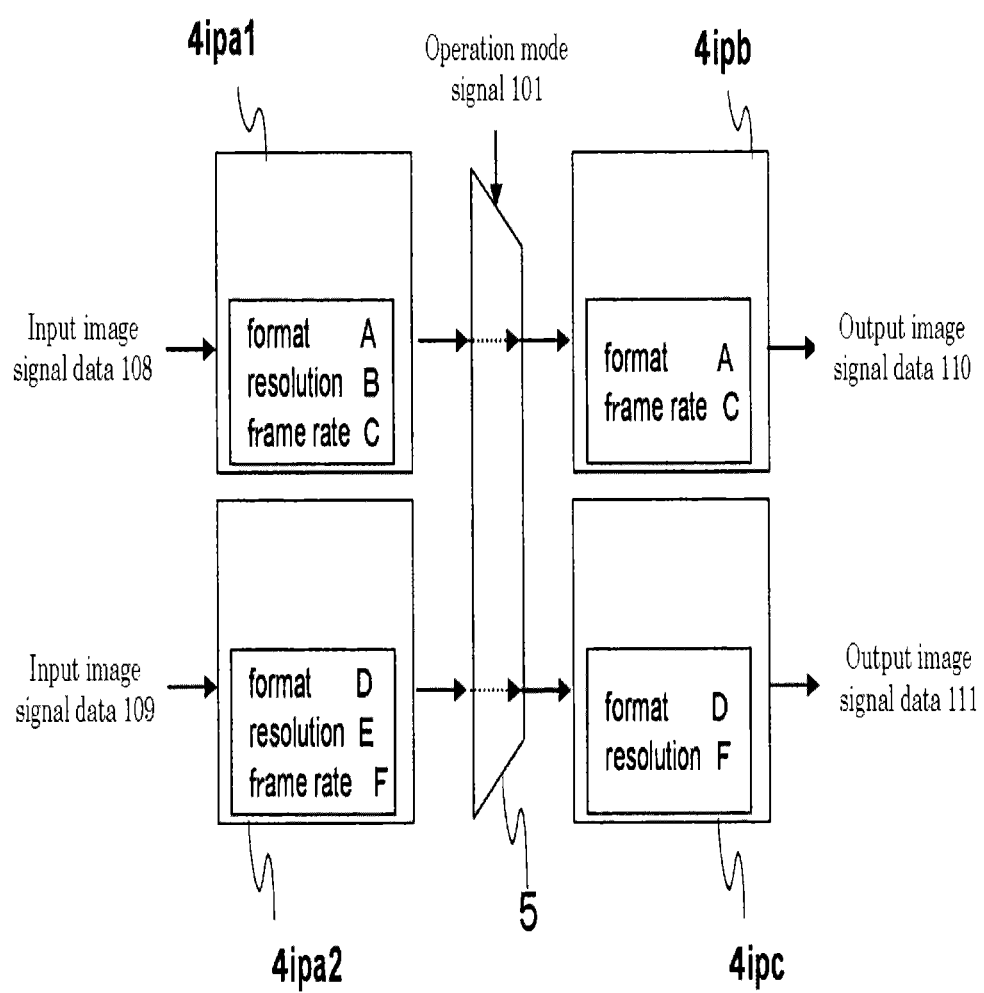
FIG. 6 is a diagram showing an example in which input image signal data is parallelly processed by mutually connected IP cores according to Embodiment 2 (when selecting the path 1)

FIG. 6 is a diagram showing an example in which input image signal data is parallelly processed by mutually connected IP cores according to Embodiment 2 when selecting the path 1). FIG. 7 is a diagram showing an example in which input image signal data is parallelly processed by mutually connected IP cores according to Embodiment 2 (when selecting a path 2). In addition, in the configuration of the LSI 1 of Embodiment 2, components equivalent to those in FIG. 1 and FIG. 5 are designated by the same numerals for omitting the explanations thereof. Furthermore, values of "A", "B", "C", "D", "E", and "F" in FIG. 6 and FIG. 7 represent values, such as the formats or resolutions of the input image signal data 108 and 109, which are written into the control registers; a same value is set to registers to which the same alphabet is attached.

Unlike the LSI 1 according to Embodiment 1, the LSI 1 according to Embodiment 2 parallelly processes input image signal data 108 and input image signal data 109. Hereinafter, explanation will be made about operations of the LSI 1 which parallelly processes the input image signal data 108 and 109 shown in FIG. 6 and FIG. 7.

FIG. 6 is an example of a case where an operation mode signal 101 indicates a path 1. In the case where the operation mode signal 101 indicates the path 1, firstly, an operation mode control circuit 6 outputs the operation mode signal 101 indicating the path 1. In response to receiving the operation mode signal 101 indicating the path 1, a selector 5 connects an IP core 4ipa1 and an IP core 4ipb. Furthermore, the selector 5 connects an IP core 4ipa2 and an IP core 4ipc. Writing operations are the same as those in Embodiment 1; therefore, the explanation thereof will be omitted. In addition, in a case where the input image signal data 108 is image signal data different from the input image signal data 109 in format, resolution, and frame rate, it is necessary for a CPU 2 to write values corresponding to the respective image input signals to the IP cores 4. After completing the writing, the input image signal data 108 passes successively through the IP core 4ipa1 and 4ipb to be outputted as input image signal data 110. Furthermore, the input image signal data 109 also passes successively through the IP core 4ipa2 and 4ipc to be outputted as output image signal data 111.

Figure 7:
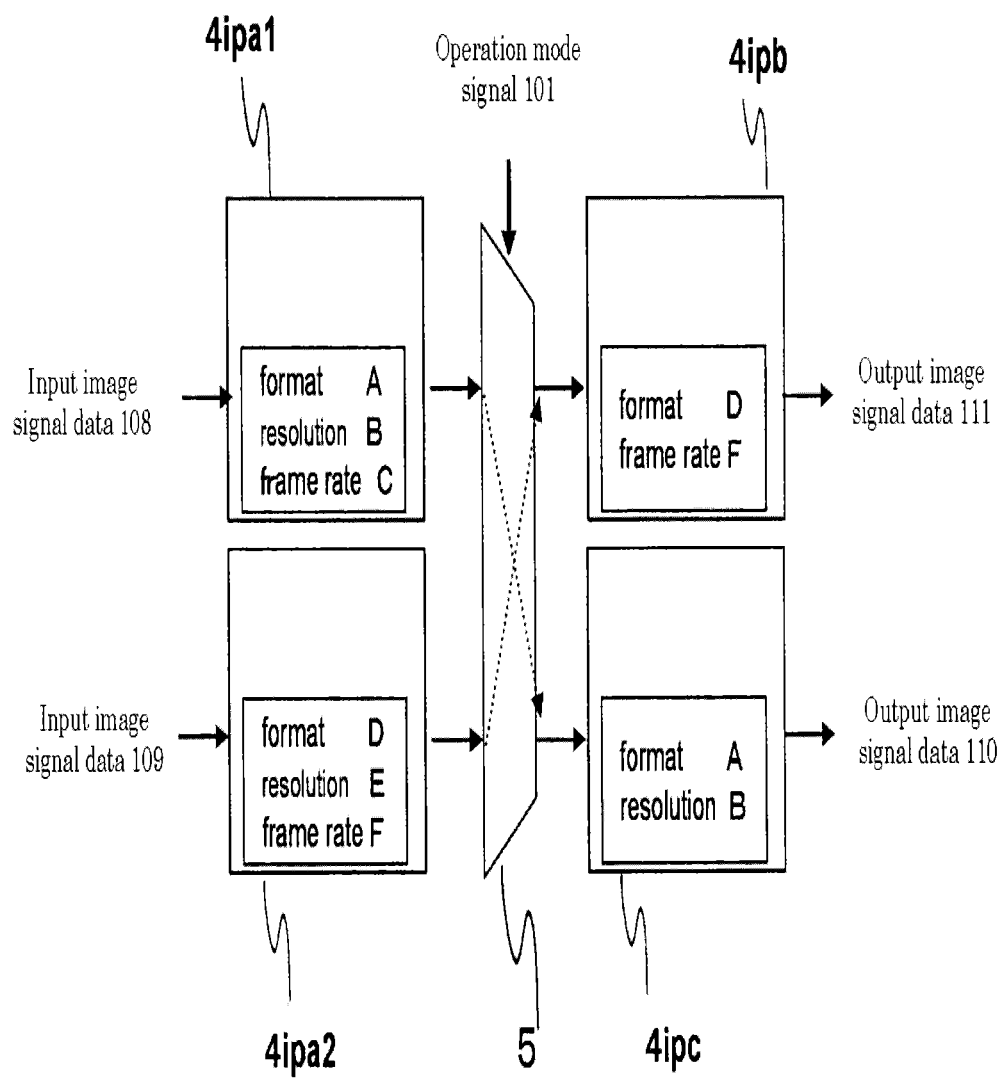
FIG. 7 is a diagram showing an example in which input image signal data is parallelly processed by mutually connected IP cores according to Embodiment 2 (when selecting a path 2)

FIG. 7 is an example of a case where the operation mode signal 101 indicates a path 2. Because the selector 5 changes the connection relation about upstream or downstream IP cores 4, the combination of the IP cores 4 is different from that of the path 1. In response to receiving the operation mode signal 101 indicating the path 2, the selector 5 connects the IP core 4ipa1 and the IP core 4ipc, and connects the IP core 4ipa2 and the IP core 4ipb.

After the address decoder 3 completes writing of all of the control registers, the input image signal data 108 passes successively through the IP cores 4ipa1 and 4ipc to be outputted as the output image signal data 110. Furthermore, the input image signal data 109 passes successively the IP cores 4ipa2 and 4ipb to be outputted as the output image signal data 111.

As described above, even in a case where the plurality of input image signal data 108 and 109 is inputted, the LSI 1 according to Embodiment 2 can determine, on the basis of the operation mode signal 101 outputted from the operation mode control circuit 6, the combination of the control registers to be accessed, to parallelly process the plurality of input image signal data.

Embodiment 3

Hereinafter, an LSI according to Embodiment 3 will be explained using FIG. 8.

Figure 8:
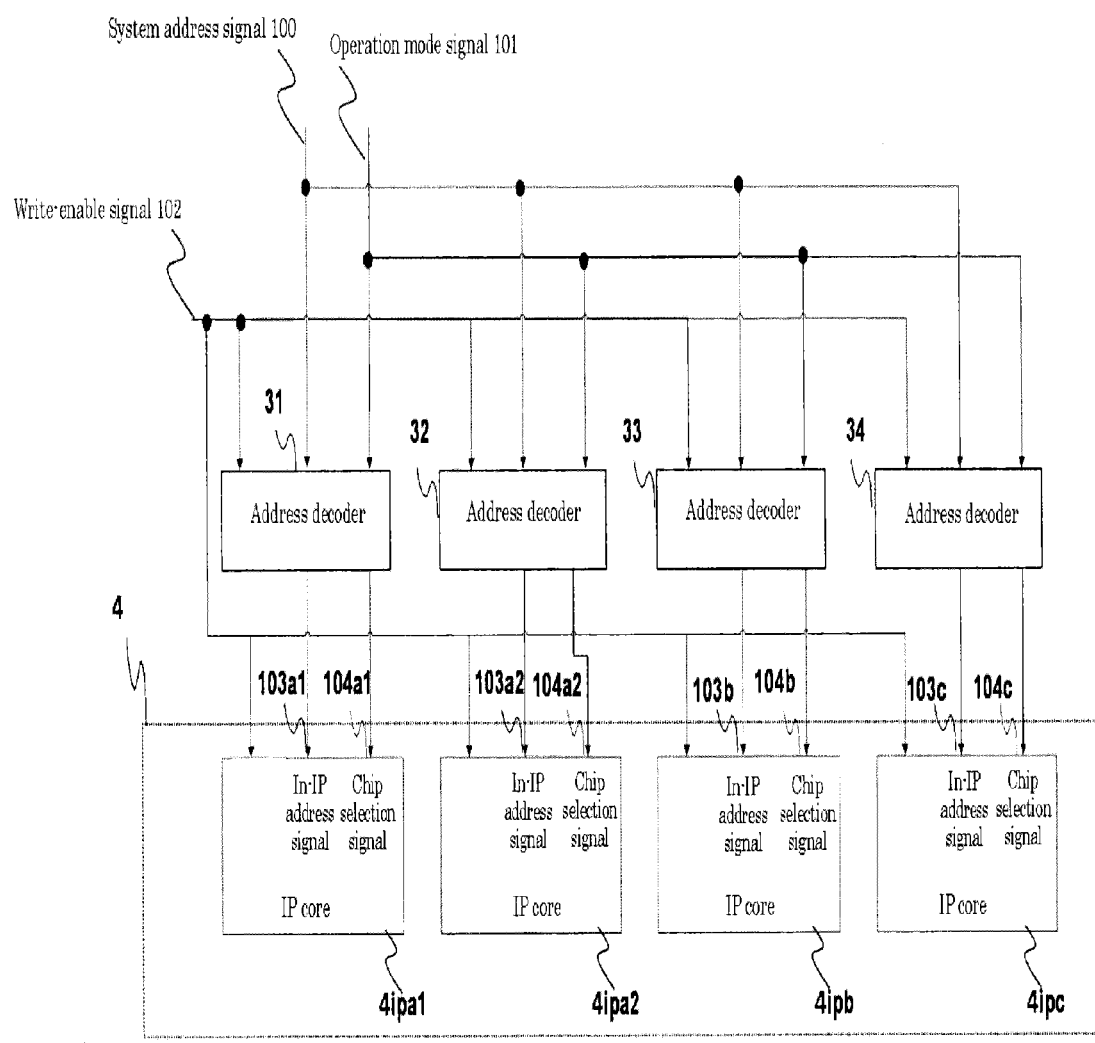
FIG. 8 is a configuration diagram of an LSI according to Embodiment 3.

FIG. 8 is a configuration diagram of an LSI according to Embodiment 3. In addition, in the configuration of the LSI 1 of Embodiment 3, components equivalent to those in FIG. 1 are designated by the same numerals for omitting the explanations thereof.

In the LSI 1 according to Embodiment 3, the IP cores 4 are provided with respective address decoders 31, 32, 33, and 34. To be more specific, connection is made between a 4ipa1-use address decoder 31 and an IP core 4ipa1, between a 4ipa2-use address decoder 32 and an IP core 4ipa2, between a 4ipb-use address decoder 33 and an IP core 4ipb, and between a 4ipc-use address decoder 34 and an IP core 4ipc.

Next, the operation of the LSI 1 will be explained. A CPU 2 outputs a system address signal 100 and a write-enable signal 102 to all address decoders 31, 32, 33, and 34. An operation mode control circuit 6 outputs an operation mode signal 101 to all address decoders 31, 32, 33, and 34. Similarly to the LSI 1 according to Embodiment 1, in response to receiving the system address signal 100, the write-enable signal 102, and the operation mode signal 101, each of the address decoders 31, 32, 33, and 34 for the respective IP cores outputs an in-IP address signal (103a1, 103a2, 103b, or 1030 and a chip selection signal (104a1, 104a2, 104b, or 1040 to the connected IP core 4. At this moment, when each of the address decoders 31, 32, 33, and 34 for the respective IP cores receives the system address signal 100, each address decoder refers to address-decoding information 302 corresponding to the connected IP core 4. Each of the address decoders 31, 32, 33, and 34 outputs, as an in-IP address signal (103a1, 103a2, 103b, or 1030, an in-IP address obtained by referring to the address-decoding information 302 to each IP core 4, to specify a control register in the IP core 4, and outputs the chip selection signal (104a1, 104a2, 104b, or 1040 to activate the selected control register.

Similarly to the LSI 1 according to Embodiment 1, the CPU 2 writes a value representing information about input image signal data 105 to the activated control register. After completing writing all of the control registers, the LSI 1 starts processing the input image signal data 105.

As described above, even in a case where the respective IP cores 4 are configured to be provided with the address decoders 31, 32, 33, and 34 corresponding thereto, the LSI 1 according to Embodiment 3 can write the registers in accordance with operation modes, using the address-decoding information 302.

Embodiment 4

Figure 9:
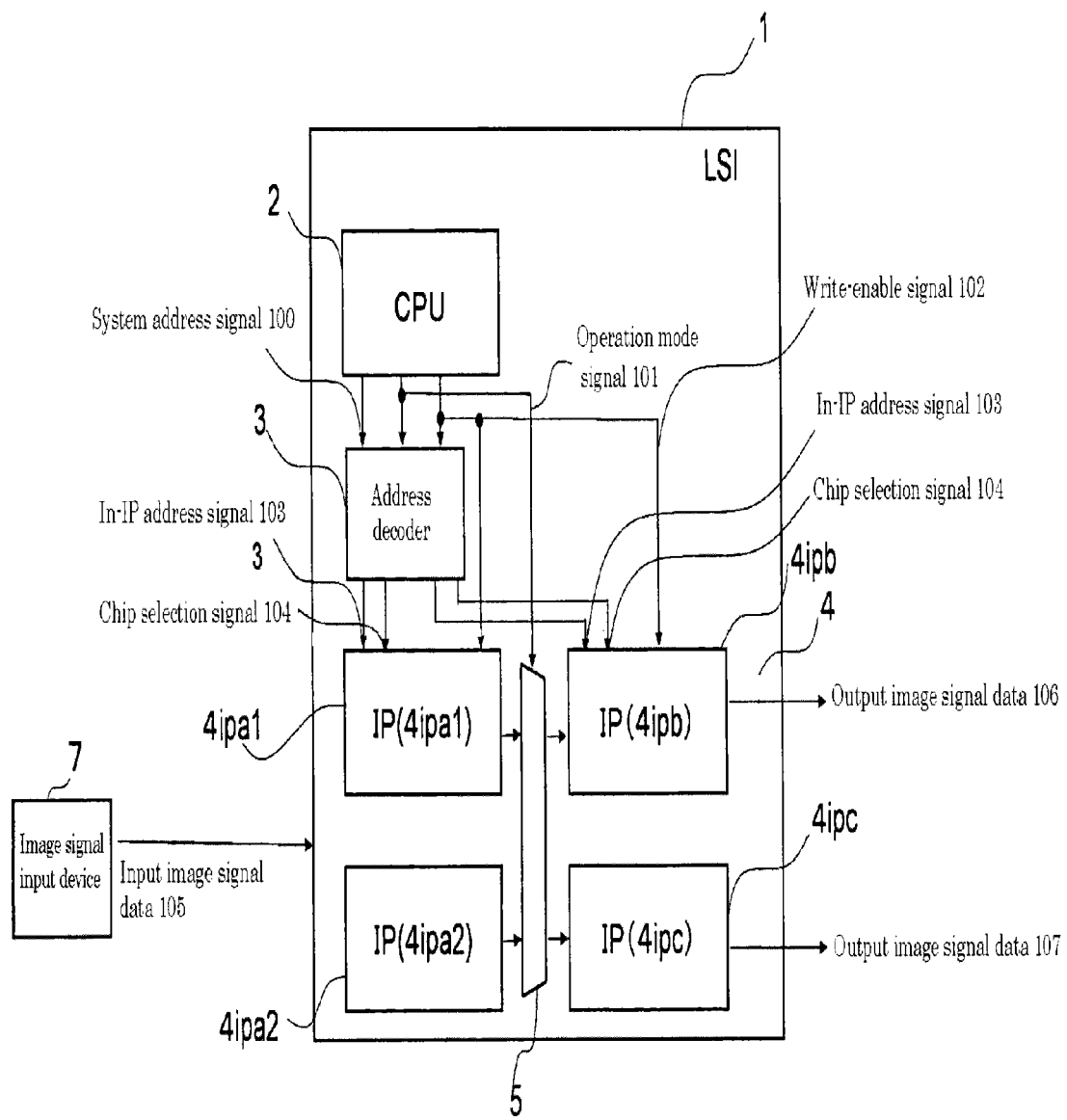
FIG. 9 is a configuration diagram of an LSI according to Embodiment 4.

Hereinafter, an LSI according to Embodiment 4 will be explained using FIG. 9. FIG. 9 is a configuration diagram of the LSI according to Embodiment 4. In addition, in the configuration of the LSI 1 of Embodiment 4, components equivalent to those in FIG. 1 are designated by the same numerals for omitting the explanations thereof.

In the LSI 1 according to Embodiment 4, an operation mode control circuit 6 is not provided; therefore, an operation mode signal 101 is outputted from a CPU 2. The CPU 2 outputs the operation mode signal 101 to an address decoder 3 and a selector 5.

According to the operation mode signal 101, a selector 5 determines a combination of the IP cores 4 to connect the IP cores 4 according to the determined combination.

The address decoder 3 receives an operation mode signal 101, to output an in-IP address signal 103 and a chip selection signal 104 to the IP cores 4 in accordance with an address-decoding information 302. In addition, an operation performed by the address decoder 3 to convert the operation mode signal 101 to the in-IP address signal 103 and the chip selection signal 104 is the same as that of the LSI 1 according to Embodiment 1; therefore, explanation thereof will be omitted.

As described above, because the LSI 1 according to Embodiment 4 is configured so that the operation mode signal 101 is outputted from the CPU 2, it becomes possible to access a plurality of control registers in each IP core 4 without particularly providing with the operation mode control circuit 6.

Embodiment 5

Figures 10, 11:
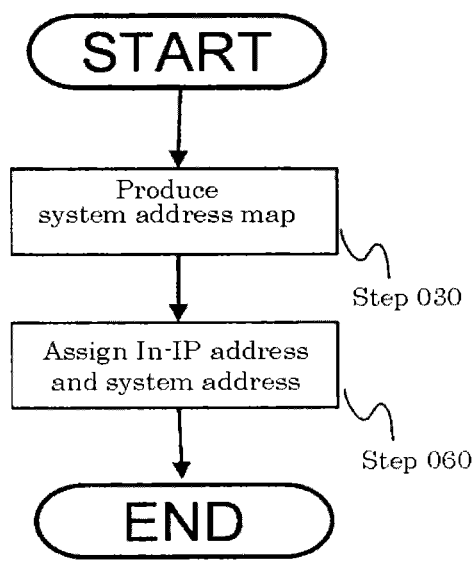
FIG. 10 is a diagram showing a flow chart to produce address-decoding information according to Embodiment 5.
FIG. 11 is a diagram listing instance names according to Embodiment 5.
Figure 14:
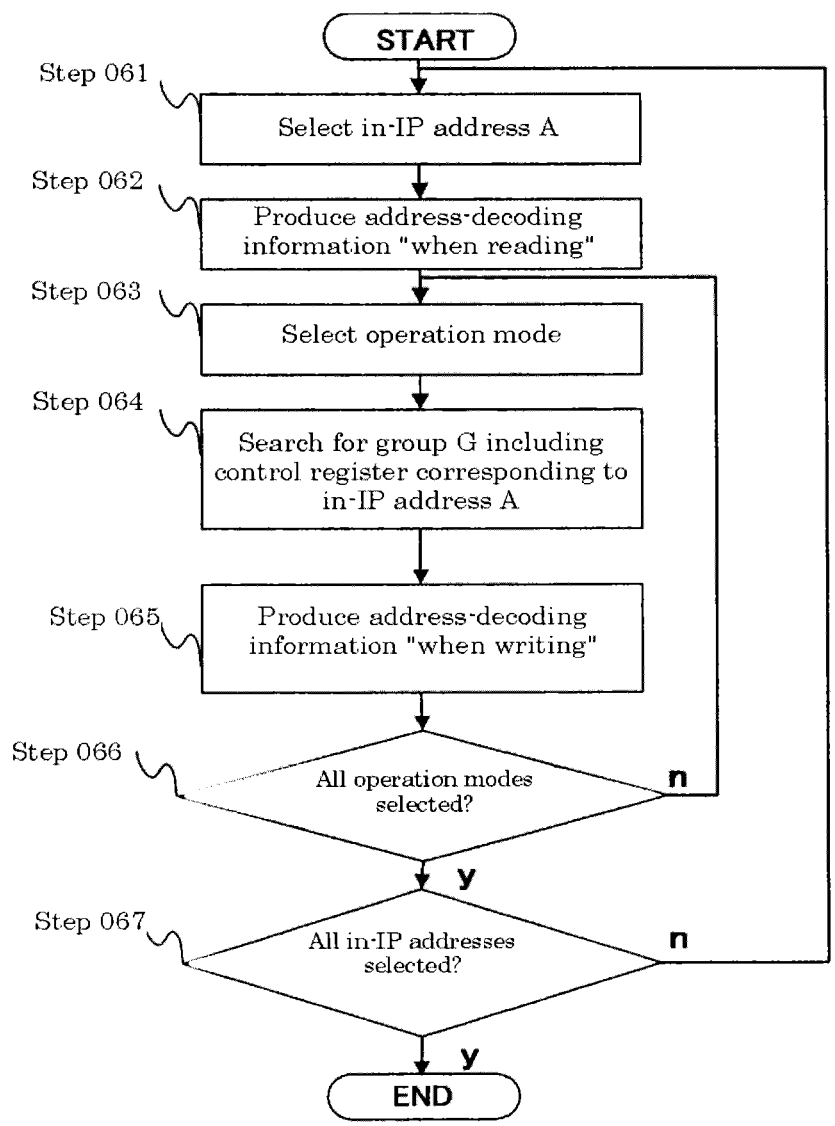
FIG. 14 is a diagram showing a flow chart explaining operations for assigning in IP addresses and system addresses according to Embodiment 5.

Hereinafter, explanation will be made about an LSI manufacturing method according to Embodiment 5, using FIGS. 10 to 14. FIG. 10 is a diagram showing a flow chart to produce address-decoding information according to Embodiment 5. FIG. 11 is a diagram listing instance names according to Embodiment 5. FIG. 12 is a diagram showing address maps of individual IP cores according to Embodiment 5. FIG. 13 is a diagram showing control register grouping information according to Embodiment 5. FIG. 14 is a diagram showing a flow chart explaining operations for assigning in-IP addresses and system addresses according to Embodiment 5.

In Embodiment 5, explanation will be made about a method of manufacturing the LSI according to Embodiment 1. In the LSI 1 according to Embodiment 1, RTL descriptions are generated with respect to elements such as the address decoder 3, the IP cores 4 and the like according to Embodiment 1; and the RTL descriptions are put together to be converted from logic circuits into a net list of a gate description level at a step referred to as a logic synthesis, and then be converted into a physical layout structure. The layout pattern thus produced is implanted and printed on a silicon wafer, so that the LSI 1 is produced. In the explanation of Embodiment 5, explanation will be made in detail about a method of producing the address-decoding information 302, which is a special feature of the LSI 1 according to Embodiment 1.

In addition, an RTL (Register Transfer Level) is a representation in which logic circuits are described with a hardware description language such as an HDL (Hardware Description Language) being a kind of computer language for designing integrated circuits, and is a representation at a level of combination of the logic circuits and registers. Furthermore, it is general that the address-decoding information 302 is automatically produced by semiconductor design assistance apparatus or the like. Furthermore, in explanation of manufacturing the LSI 1 of Embodiment 5, components equivalent to those in FIG. 1 and FIGS. 5 to 8 are designated by the same numerals for omitting the explanations thereof.

Using FIG. 10, a method of producing the address-decoding information 302 will be explained in detail.

FIG. 10 is a diagram showing a flow chart to produce the address-decoding information. At first, in producing the address-decoding information 302, a system address map 301 is produced at Step 030. Next, at Step 060, in-IP addresses and system addresses are assigned using the system address map 301 produced at Step 030, so that the address-decoding information 302 is produced.

Hereinafter, Step 030 will be explained in detail. In addition, the system address map 301 relates system addresses to instance names, control register names, and in-IP addresses of IP cores 4 to be used.

For producing the system address map 301, an instance name list 303 of the IP cores 4 and address maps 304 of individual IP cores 4 are necessary. FIG. 11 shows the instance name list 303 of the IP cores 4. The instance name list 303 of the IP cores 4 is a correspondence list between IP names and instance names. An IP name is a name assigned to an IP core 4, and a same name is assigned to IP cores 4 having a same function. An instance name is a name assigned for identifying an IP core 4 to be used. In a case where a plurality of IP cores 4 having a same function is used, all different instance names are assigned for identifying each of the plurality of IP cores 4. Furthermore, FIG. 12 shows address maps of individual IP cores 4. An address map of an IP core 4 relates control register names of the IP core 4 to in-IP addresses thereof. In addition, the instance name list 303 of the IP cores 4 and the address maps 304 of individual IP cores 4 are manually produced as text files or the like.

The system address map 301 is produced on the basis of both of the instance name list 303 and the address maps 304 of individual IP cores 4, which have been prepared as described above.

Next, Step 060 will be explained.

First, an architect prepares information 305 about grouping control registers. FIG. 13 shows an example of the control register grouping information 305. The control register grouping information 305 indicates groups of control registers with a same value to be written by the CPU 2. Furthermore, the control register grouping information 305 exists in accordance with the operation modes. Control registers combined in groups vary according to the operation modes. The LSI architect determines combinations and groups of control registers on the basis of connection configuration of the IP cores 4, details of processing and the like. For example, the upper table in FIG. 13 is control register grouping information 305 which is designed for an operation mode of path 1, that is, for a case where the IP core 4*ipa*1 and the IP core 4*ipb* are connected, and the IP core 4*ipa*2 and the IP core 4*ipc* are connected. To a column of "group 1", "ipa1.format" and "ipb.format" belong. Because "ipa1.format" and "ipb.format" belong to the column of "group 1", the address decoder 3 can access a plurality of control registers format included in the IP cores 4*ipa*1 and 4*ipb* with a single system address signal. Furthermore, the control register grouping information 305 indicates that, in an operation mode of path 2, the selector 5 connects the IP core 4*ipa*1 and the IP core 4*ipc*, and connects the IP core 4*ipa*2 and the IP core 4*ipb*.

In addition, in FIG. 13, characters before"." indicate an instance name, and characters after "." indicate a control register name. For example, with respect to ipa1.format in the column of "group 1" of "operation mode=path 1", ipa1 before "." indicates the instance name of the IP core 4*ipa*1, and characters after "." indicate the control register name of the control register format. As described above, each component in a group is formed with the instance name of an IP core 4 and a control register name thereof. Furthermore, the description of "." is an example for explanation and does not limit the description manner of the control register grouping information 305 in the present invention. This control register grouping information 305 is manually produced as a text file or the like.

Next, the address-decoding information 302 is produced using the system address map 301 produced at Step 030 and this control register grouping information 305.

FIG. 14 is a flow chart explaining operations for assigning in-IP addresses and system addresses.

At Step 061, an in-IP address is selected with reference to the system address map 301. The in-IP address obtained here is referred to as A.

At Step 062, with respect to the in-IP address A, a system address "when reading" is assigned in accordance with the system address map 301.

At Step 063, an operation mode is selected.

At Step 064, referring to the control register grouping information 305 in the operation mode selected at Step 063, the system address map 301 is searched for a group including a system address corresponding to the in-IP address A. Here, the group obtained as a result of the searching is referred to as G.

At Step 065, system addresses of all control registers belonging to the group G are assigned to the in-IP address A to produce address-decoding information "when writing".

At Step 066, in a case where the system address of the in-IP address A and the system addresses belonging to the group including the in-IP address A have been related with respect to all operation modes, the process proceeds to Step 067. In a case where the system address of the in-IP address A and the system addresses belonging to the group including the in-IP address A have not been related with respect to all operation modes, the process returns to Step 063. After returning to Step 063, an operation mode in which the in-IP address A has not been assigned is selected to repeat the operations from Step 063 to Step 066.

At Step 067, if the relating of all in-IP addresses to system addresses "when reading" and "when writing" is completed, the process ends. On the other hand, if the relating of all in-IP addresses to system address "when reading" and "when writing" has not been completed, the process returns to Process Step 061. After returning to Step 061, the process repeats operations from Step 061 to Step 066 to relate to the system addresses, in-IP addresses being still unrelated to the system addresses.

In a manner described above, system addresses are related to all in-IP addresses to produce the address-decoding information 302.

From the address-decoding information 302 thus produced, necessary port widths for inputting and outputting are determined, RTL descriptions of the in-IP address signal and the chip selection signal 104 are produced, and RTL descriptions of the address decoder 3 are produced. These RTL descriptions are logically synthesized into a netlist, which is converted into a physical layout structure, and finally printed on a silicon wafer to produce an LSI 1.

As described above, because the architect has beforehand determined, as control register grouping information 305, the groups of control registers necessary for processing the input image signal data 105 for individual operation modes, the work of developing a program of the CPU 2 can be reduced even when the number of IP cores 4 to be controlled increases.

In addition, the method of manufacturing the LSI 1 according to Embodiment 5 has been explained in an example of a method of manufacturing the LSI 1 for processing the input image signal data 105; however, the method may be a method of manufacturing an LSI 1 for processing audio signal data or the like, that is, the present invention is not limited to the method of manufacturing the LSI 1 for processing the input image signal data 105. Furthermore, in the example described above, the method of manufacturing the LSI according to Embodiment 1 has been explained; however, the LSIs 1 according to Embodiments 2 to 4 can be manufactured in the same procedure.

NUMERAL EXPLANATION

1 LSI
2 CPU
3 address decoder
4 IP core
5 selector
6 operation mode control circuit
31 4*ipa*1-*use* address decoder
32 4*ipa*2-*use* address decoder
33 4*ipb*-use address decoder
34 4*ipc*-use address decoder
301 system address map
302 address-decoding information
303 IP core instance name list
304 individual IP cores' address maps
305 control register grouping information

The invention claimed is:
1. An LSI comprising:
a plurality of IP cores (Intellectual Property Cores) each of which has a plurality of registers and processes input data;
an address decoder that selects a register among the plurality of registers and activates it;
a CPU that outputs to the address decoder, a system address signal designating a register of an IP core used for processing the input data, and writes information of the input data to a register activated by the address decoder; and
an operation mode control circuit which outputs to the address decoder, an operation mode signal specifying a combination of the IP cores used for processing the input data,
wherein the address decoder determines, according to the operation mode signal, a combination of the IP cores used for processing the input data, and
wherein among registers of the IP cores determined to be used, the address decoder selects and activates a register designated by the system address signal and another register into which to write the same information as that in the designated register.

2. The LSI according to claim 1, wherein based on groups including a plurality of system addresses by which the CPU identifies the registers, based on in-IP addresses for the address decoder to identify the registers, and based on address-decoding information, in which combinations of the system addresses included in the groups are different with respect to operation modes indicated by the operation mode signal, and the groups and the in-IP addresses are related, the address decoder specifies an in-IP address corresponding to a system address indicated by a system address signal outputted from the CPU, and activates a register indicated by the specified in-IP address.

3. The LSI according to claim 1, further comprising a selector which receives the operation mode signal to connect IP cores, with each other, to be used for processing the input data.

* * * * *